(12) United States Patent
Rysgaard (10) Patent No.: US 10,064,209 B2
(45) Date of Patent: Aug. 28, 2018

(54) COMMUNICATION DEVICE AND METHOD FOR CONTROLLING A RECEIVER

(71) Applicant: Intel Deutschland GmbH, Neubiberg (DE)

(72) Inventor: Bent Henneberg Rysgaard, Aalborg Oest (DK)

(73) Assignee: Intel Deutschland GmbH, Neubiberg (DE)

( * ) Notice: Subject to any disclaimer, the term of this patent is extended or adjusted under 35 U.S.C. 154(b) by 0 days.

(21) Appl. No.: 15/230,702

(22) Filed: Aug. 8, 2016

(65) Prior Publication Data

US 2016/0353468 A1    Dec. 1, 2016

Related U.S. Application Data

(63) Continuation of application No. 13/719,349, filed on Dec. 19, 2012, now abandoned.

(51) Int. Cl.
*H04W 72/12* (2009.01)
*H04B 17/318* (2015.01)
(Continued)

(52) U.S. Cl.
CPC ...... *H04W 72/1231* (2013.01); *H04B 17/318* (2015.01); *H04B 17/336* (2015.01);
(Continued)

(58) Field of Classification Search
CPC ... H04W 88/06; H04W 16/14; H04W 72/085; H04W 72/1215; H04W 88/02;
(Continued)

(56) References Cited

U.S. PATENT DOCUMENTS

| 6,961,583 | B2* | 11/2005 | Moles | ........... H04W 36/30 |
| | | | | 455/426.1 |
| 7,532,595 | B2* | 5/2009 | Nibe | ........... H04L 1/0026 |
| | | | | 370/329 |

(Continued)

FOREIGN PATENT DOCUMENTS

| CN | 101217747 A | 7/2008 |
| CN | 101534562 A | 9/2009 |

(Continued)

OTHER PUBLICATIONS

Chinese Office Action based on Application No. 201310700878.1 (10 Pages and 10 Pages of English Abstract) dated Jun. 2, 2017 (Reference Purpose Only).

(Continued)

*Primary Examiner* — Jaime Holliday
(74) *Attorney, Agent, or Firm* — Viering, Jentschura & Partner MBB (57) ABSTRACT

A communication device is described including a receiver, a determiner configured to determine, for a first data transmission via a first communication channel and a second data transmission via a second data communication channel, wherein the first data transmission and the second data transmission overlap in time, a first time period during which the receiver is to receive data transmitted in the first data transmission and a second time period during which the receiver is to receive data transmitted in the second data transmission based on information about the quality of data transmission via the first communication channel and based on information about the quality of data transmission via the second communication channel and a controller configured to control the receiver to receive data transmitted in the first data transmission during the first time period and to receive (Continued)

data transmitted in the second data transmission during the second time period.

20 Claims, 5 Drawing Sheets (51) Int. Cl.
  *H04B 17/336* (2015.01)
  *H04W 76/15* (2018.01)
  *H04W 72/08* (2009.01)
  *H04W 72/04* (2009.01)
  *H04W 28/18* (2009.01)
  *H04W 88/06* (2009.01)
  *H04W 16/14* (2009.01)
  *H04W 88/02* (2009.01)
  *H04W 74/00* (2009.01)
  *H04W 88/10* (2009.01)

(52) U.S. Cl.
  CPC ....... *H04W 72/0446* (2013.01); *H04W 76/15* (2018.02); *H04W 16/14* (2013.01); *H04W 28/18* (2013.01); *H04W 72/042* (2013.01); *H04W 72/0406* (2013.01); *H04W 72/085* (2013.01); *H04W 72/1215* (2013.01); *H04W 74/002* (2013.01); *H04W 88/02* (2013.01); *H04W 88/06* (2013.01); *H04W 88/10* (2013.01)

(58) Field of Classification Search
  CPC ........... H04W 72/0406; H04W 72/042; H04W 74/002; H04W 76/025
  USPC .......................... 455/88, 550.1, 552.1, 553.1
  See application file for complete search history.

(56) References Cited

U.S. PATENT DOCUMENTS

| 8,767,708 B2* | 7/2014 | Krishnamurthy ...... H04J 11/005 370/350 |
| 9,148,870 B2 | 9/2015 | Clevorn et al. |
| 2007/0099652 A1* | 5/2007 | Lindoff ................. H04W 48/16 455/552.1 |
| 2010/0091802 A1* | 4/2010 | Matsui .................. H04L 12/417 370/498 |
| 2012/0172041 A1 | 7/2012 | Krishnamurthy et al. |
| 2012/0264390 A1 | 10/2012 | Clevorn et al. |
| 2012/0275380 A1 | 11/2012 | Chin et al. |
| 2013/0023275 A1* | 1/2013 | Mutya .................. H04W 88/06 455/452.1 |

FOREIGN PATENT DOCUMENTS

| CN | 101577961 A | 11/2009 |
| CN | 102740461 A | 10/2012 |

OTHER PUBLICATIONS

German Office Action based on application No. 10 2013 112 743.6 (15 pages) dated Jul. 13, 2017 (Reference Purpose Only).
Office Action received for corresponding Chinese Application No. 201310700878.1 dated Sep. 30, 2016, 12 pages (Information Purpose Only).

* cited by examiner

FIG 5

COMMUNICATION DEVICE AND METHOD FOR CONTROLLING A RECEIVER

RELATED APPLICATION(S)

This application is a continuation of U.S. patent application Ser. No. 13/719,349, entitled "COMMUNICATION DEVICE AND METHOD FOR CONTROLLING A RECEIVER", filed Dec. 19, 2012, which is hereby incorporated by reference in its entirety.

TECHNICAL FIELD

The present disclosure relates to communication devices and methods for controlling a receiver.

BACKGROUND

When operating a communication device, the case may occur that the reception of two sets of information, which should both be received by the mobile communication device, has a conflict, e.g. due to the collision of the transmission timing of the two sets of information. For example, a communication device including two SIMs (Subscriber Identity Modules) which are in service in parallel may need to receive paging information from two different base station and the transmission of the two sets of paging information may overlap. Efficient ways to avoid and handle such conflicts are desirable.

SUMMARY

A communication device is provided including a receiver, a determiner configured to determine, for a first data transmission via a first communication channel and a second data transmission via a second data communication channel, wherein the first data transmission and the second data transmission overlap in time, a first time period during which the receiver is to receive data transmitted in the first data transmission and a second time period during which the receiver is to receive data transmitted in the second data transmission based on information about the quality of data transmission via the first communication channel and based on information about the quality of data transmission via the second communication channel and a controller configured to control the receiver to receive data transmitted in the first data transmission during the first time period and to receive data transmitted in the second data transmission during the second time period.

Further, a method for controlling a receiver according to the communication device described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects.

Figure 1:
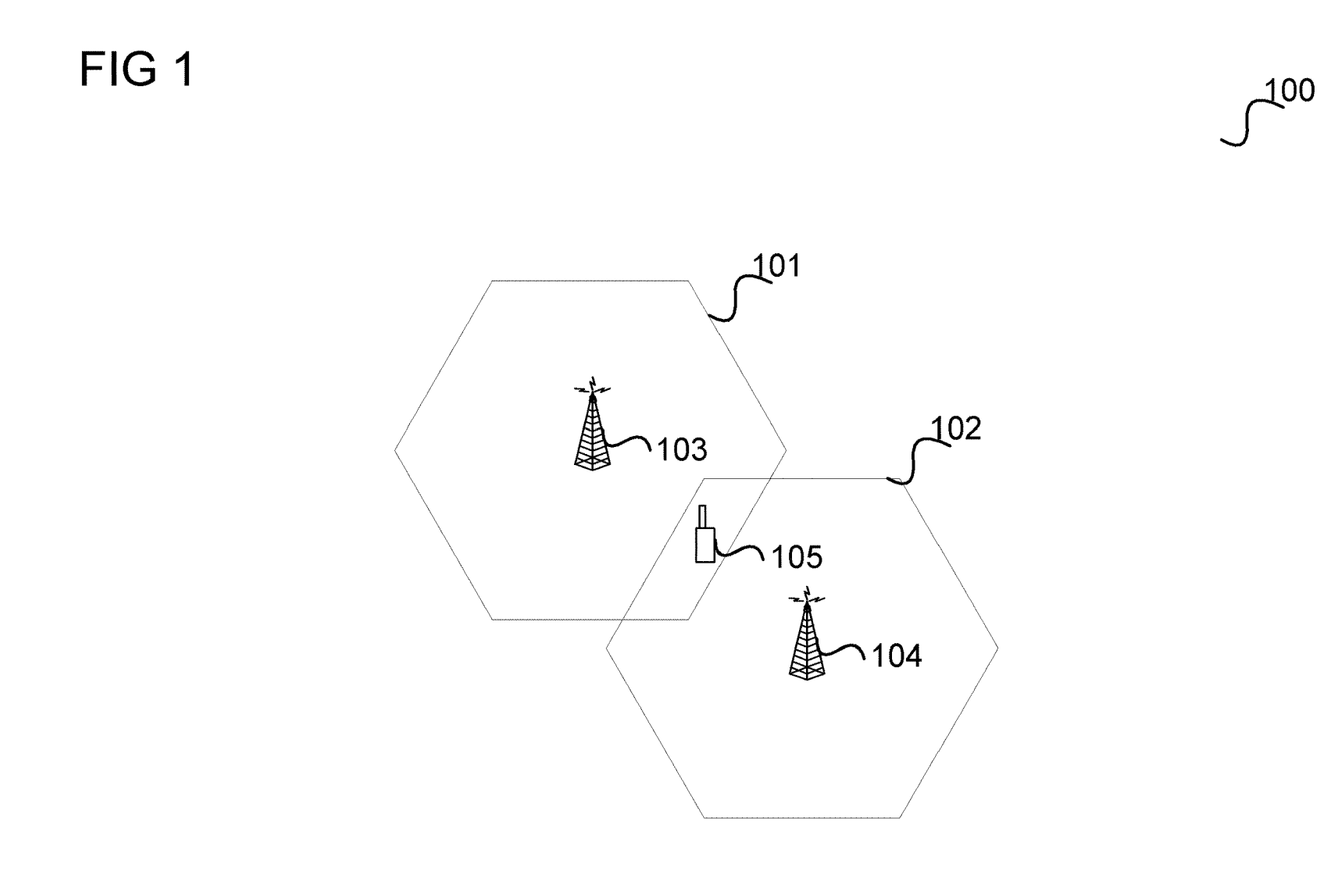
FIG. 1 shows a communication arrangement.

FIG. 1 shows a communication arrangement 100.

The communication arrangement 100 includes a first radio cell 101 and a second radio cell 102. The first radio cell 101 is operated by a first base station 103 and the second radio cell 102 is operated by a second base station 104. The first base station 103 is for example part of a radio access network of a first mobile communication network and the second base station 104 is for example part of a radio access network of a second mobile communication network. It is assumed that the first mobile communication network and the second communication network are different mobile communication networks, e.g. are operated by different operators and/or require separate subscriptions.

The first mobile communication network and the second mobile communication network each may for example be a GSM (Global System for Mobile Communications) communication system, a UMTS (Universal Mobile Telecommunications System), a CDMA2000 (CDMA: Code Division Multiple Access) communication system, an LTE (Long Term Evolution) communication system or a FOMA (Freedom of Mobile Access) communication system.

The first radio cell 101 and the second radio cell 102 are assumed to overlap such that a mobile terminal 105 located in the overlap area of the first radio cell 101 and the second radio cell 102 can receive signals from both the first base station 103 and the second base station 104 and can use both the first communication network and the second communication network for communication.

For being able to use both the first communication systems and the second communication system, the mobile terminal 105 may include two (or more) subscriber identity modules, e.g. SIMs or USIMs (Universal Subscriber Identity Modules). In other words, the mobile terminal 105 may be a multi-SIM device supporting communication via two (or more) different mobile communication networks.

The mobile terminal 105 is for example a multi-SIM device with only one RF (radio frequency) receiver. This means that the mobile terminal 105 is only able to receive data from either the first base station 103 or the second base station 104 at a time. For example, the mobile terminal 105 is only able to tune to a communication channel of either the first base station 103 or the second base station 104 at a time and/or is only able to tune to either the frequency range used by the first base station 103 for operating the first radio cell 101 or the frequency range used by the second base station 104 for operating the second radio cell 102. An RF receiver may be understood as a component of the mobile terminal 105 performing the reception processing of signals received via an antenna of the mobile terminal 105 processing up to including conversion into base band.

In such a scenario, conflicts may happen when the mobile terminal 105 tries to maintain communication services via both the first communication network and the second communication network, e.g. when the mobile terminal 105 should be reachable by incoming calls via both the first communication network and the second communication network (e.g. to meet communication standard, e.g. 3GPP, requirements). Such conflicts may arise due to the requirement of receiving information from the first communication network (i.e. from the first base station 103) and the second communication network (i.e. the second base station 104) at specific points in time and due to the duration of such reception periods. For example, in case that both the first communication network and the second communication network are GSM communication systems, the mobile terminal may be required to listen to pagings (i.e. to the information of incoming calls) at specific points in time configured by the first communication network and the second communication network. This is illustrated in FIG. 2.

Figure 2:
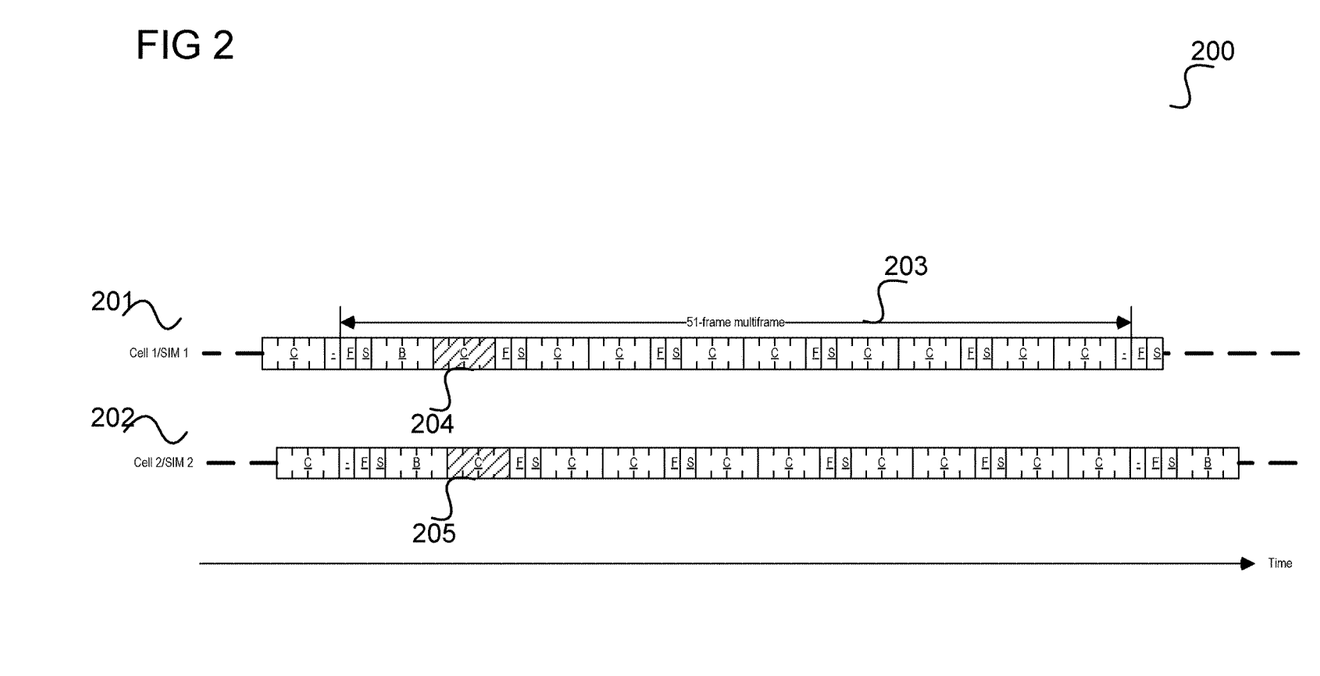
FIG. 2 shows a transmission diagram illustrating an overlapping of data transmissions.

FIG. 2 shows a transmission diagram 200.

A first transmission sub-diagram 201 illustrates the transmission of data from the first base station 103 and a second transmission sub-diagram 202 illustrates the transmission of data from the second base station 104. In this example, the transmissions are carried out according to a format according to GSM as specified by 3GPP (Third Generation Partnership Project).

The transmissions of data by the first base station 103 and the second base station 104 are structured into frames, wherein 51 consecutive frames form a 51-frame multiframe 203. Time is running from left to right.

Blocks of four frames marked with 'C' are allocated for sending paging information within the first radio cell 101 and the second radio cell 102. It should be noted that not all of the blocks marked with 'C' need to be allocated for sending paging information, e.g. depending on the allocation by the network. Thus, the case may occur that a first block 204 (shown with a hatching for better illustration) is used for sending paging information of the first mobile communication network to the mobile terminal 105 and a second block 205 (shown with a hatching for better illustration) is used for sending paging information of the second mobile communication network to the mobile terminal 105. The first block 204 and the second block 205 can be seen as the paging blocks allocated to the mobile terminal 105 for the first mobile communication network and the second mobile communication network, respectively. Since in this case, the transmissions overlap in time the mobile terminal 105, assumed to have only one RF receiver, may be able to receive the paging information of both mobile communication networks.

In other words, since the transmission timings of the paging channel of the first mobile communication network (blocks marked with "C" of the first transmission sub-diagram 201) overlap with the transmission timings of the paging channel of the second mobile communication network (blocks marked with "C" of the second transmission sub-diagram 202) there is a risk that the mobile terminal 105 misses paging information of one of the mobile communication networks or, in other words, the likelihood of receiving all the paging information addressed to the mobile terminal 105 is reduced. It should be noted that the blocks marked with 'C' may also be used for other information such as broadcast information or signaling information. However, similarly to this example where there is a risk that paging information is missed there may be analogously the risk to miss other kind of information.

Also, the paging sub-channel (or, in other words, the frames allocated for the transmission of paging information) of one of the mobile communication networks may collide with another activity related to the other of the mobile communication networks, such as the transmission of system information, e.g. via the BCCH (Broadcast Channel), in one of the blocks marked with "B" in the transmission sub-diagrams 201, 202. If the paging sub-channel collides with too many occurrences of system information transmission, for example, the mobile terminal 105 may be prevented from reading enough system information to enter service on a radio cell 101, 102.

Figure 3:
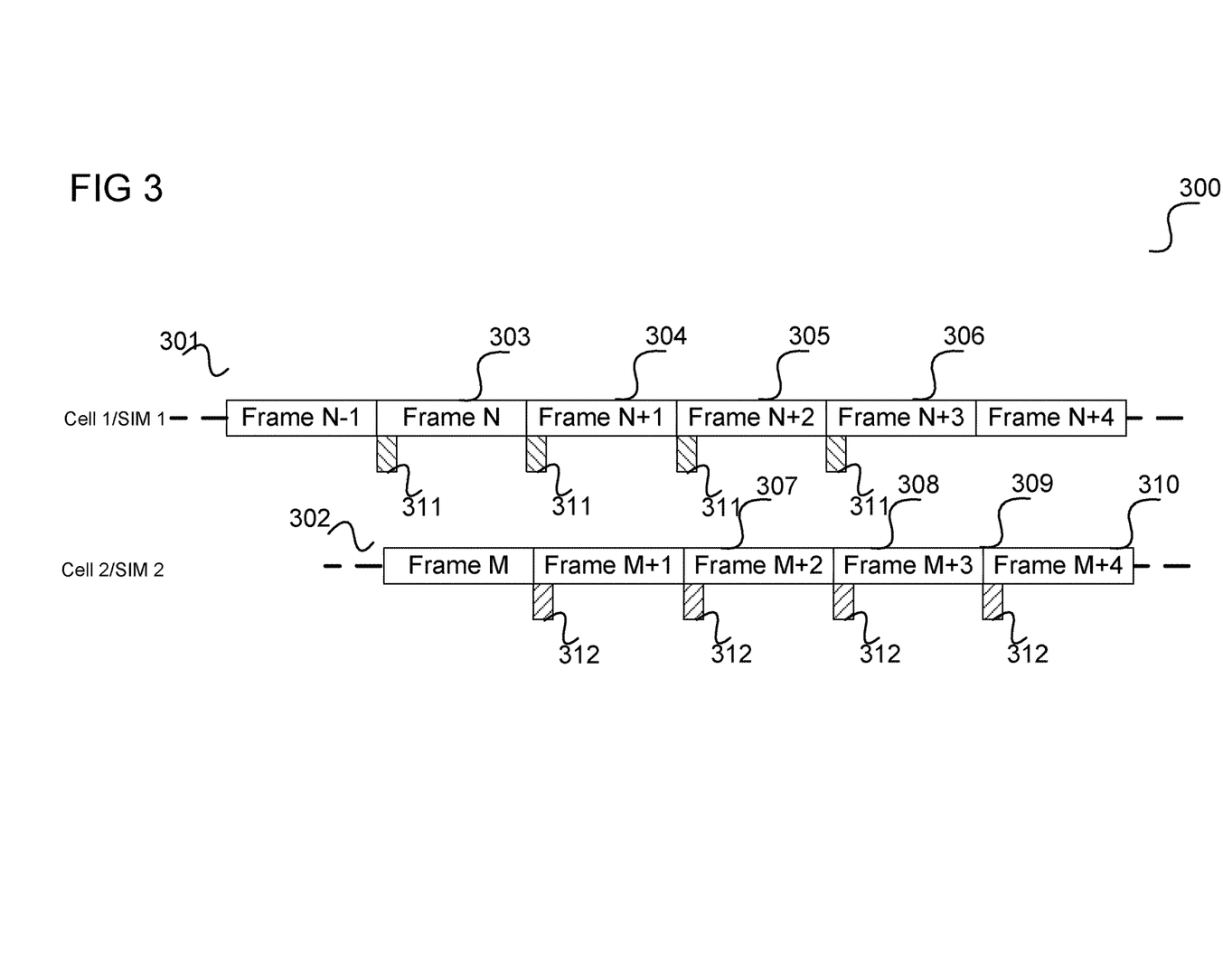
FIG. 3 shows a transmission diagram illustrating an overlapping of data transmissions in greater detail.

The overlapping between the first paging block 204 and the second paging block 205 is shown in more detail in FIG. 3.

FIG. 3 shows a transmission diagram 300.

A first transmission sub-diagram 301 illustrates the transmission of data from the first base station 103 and a second transmission sub-diagram 302 illustrates the transmission of data from the second base station 104. In this example, the transmissions are carried out according to a format according to GSM as specified by 3GPP (Third Generation Partnership Project).

As described with reference to FIG. 2, the transmissions of data by the first base station 103 and the second base station 104 are structured into frames.

In this example, the first base station 103 sends data in a first frame 303 (frame N), in a second frame 304 (frame N+1), in a third frame (frame N+2) 305 and a fourth frame (frame N+3) 306. These frames 303 to 306 for example correspond to the frames of the first paging block 204. During each of these frames 303 to 306 a transmission of paging data (paging message) 311 is carried out by the first base station 103. In this example, the transmissions of paging messages 311 are carried out at the beginning of the frames 303 to 306.

The second base station 103 sends data in a fifth frame 307 (frame M), in a sixth frame 308 (frame M+1), in a seventh frame (frame M+2) 309 and an eighth frame (frame M+3) 310. These frames 307 to 310 for example correspond to the frames of the second paging block 205. During each of these frames 307 to 310 a transmission of paging data (a paging message) 312 is carried out by the second base station 103. In this example, the transmissions of paging messages 312 are carried out at the beginning of the frames 307 to 310.

It can be seen that the paging data transmissions of the second frame 304, the third frame 305 and the fourth frame 306 overlap with the paging data transmission of the fifth frame 307, the sixth frame 308 and the seventh frame 309.

It should be noted that even if the timing of the paging message transmissions by the first base station 311 (i.e. the transmission bursts) do not directly overlap the paging message transmissions by the second base station 312 (which may also happen depending on the timing of the base stations 103, 104) the overlapping of the frames 304 to 309 may still lead to that the mobile terminal 105 cannot receive all the paging messages transmitted during the frames 304 to 309. For example, in case the mobile terminal 105 receives the paging information sent by the first base station 103 during the second frame 304, its receiver may not be switched quickly enough (e.g. tuned from the frequency used by the first base station 103 to the frequency used by the second base station 104) to be able to receive the paging information sent by the second base station 104 during the fifth frame 307. For example, between the paging information transmission 311 of the second frame 304 and the paging information transmission 312 of the fifth frame 307 may only lie around 2 ms which may be too short to re-tune the mobile terminal's receiver.

In case of such a collision between transmissions, in this case the transmission of a paging message in the paging message transmissions 311 and the transmission of paging message in the paging message transmissions 312, the transmission of which data is received is for example selected based on some criterion, e.g. it is decided when data is received from one data transmission and when data is received from the other data transmission for example based on priorities of the data transmissions or a best effort approach.

It should be noted that redundancy in the data may allow to correctly receive data transmitted in a first data transmission and data transmitted in the second data transmission even if the data transmissions overlap in time and cannot both be received completely. For example, redundancy of the paging data transmitted in the paging data transmissions 311, 312 may allow reconstructing the transmitted paging data even if the paging data transmissions 311, 312 have not been completely received.

A communication device is for example provided that determines up front, i.e. in advance, e.g. before the data transmissions take place, how much reception time should be allocated for different data transmissions (and accordingly for different communication channels) such that the transmitted data can be reconstructed with high likelihood (exploiting redundancy). This allows deciding up front about an efficient reception time allocation that allows receiving as much data as possible. This determination is for example performed based on information about the quality of the data transmission as described in the following with reference to FIG. 4.

Figure 4:
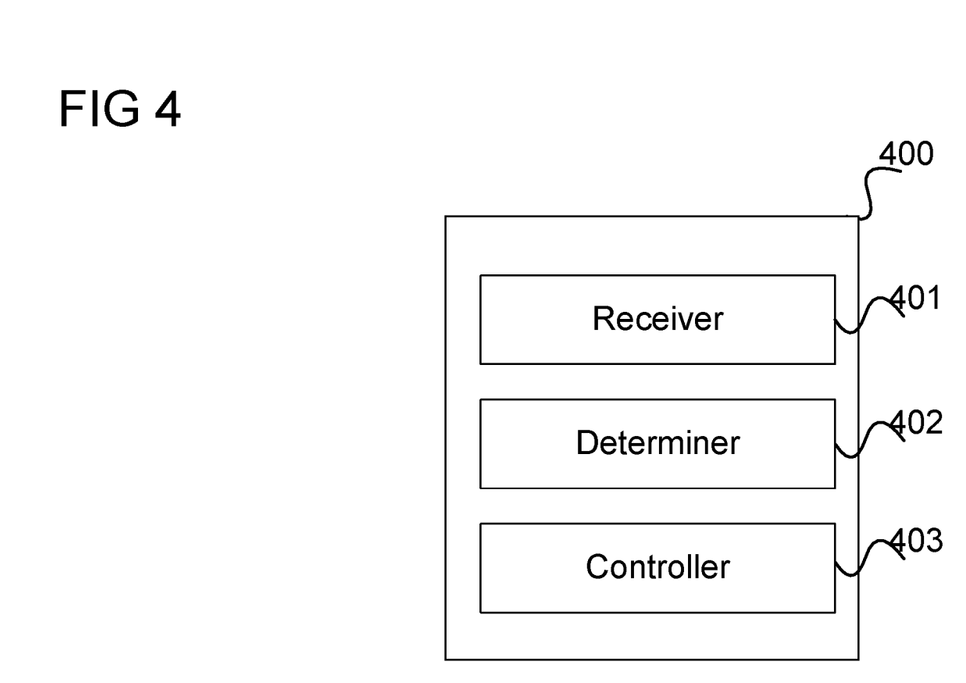
FIG. 4 shows a communication device.

FIG. 4 shows a communication device 400.

The communication device 400 includes a receiver 401 and a determiner 402 configured to determine, for a first data transmission via a first communication channel and a second data transmission via a second data communication channel, wherein the first data transmission and the second data transmission overlap in time, a first time period during which the receiver is to receive data transmitted in the first data transmission and a second time period during which the receiver is to receive data transmitted in the second data transmission based on information about the quality of data transmission via the first communication channel and based on information about the quality of data transmission via the second communication channel.

The communication device 400 further includes a controller 403 configured to control the receiver to receive data transmitted in the first data transmission during the first time period and to receive data transmitted in the second data transmission during the second time period.

In other words, for example, a communication device (e.g. a mobile communication device such as a mobile terminal, e.g. a cell phone) determines the reception quality of a first communication channel via which a first data transmission is performed and the reception quality of a second communication via which a second data transmission is performed and allocates reception times for the data transmission based on the determined reception qualities.

It should be noted that more than two data transmissions may be involved. For example, in case of triple SIM mobile terminal, the determiner may be configured to determine time periods for the reception of paging data or system information from three radio cells based on respective reception qualities.

The determiner is for example configured to determine the first time period and the second time period such that the first time period is longer than the second time period if the quality of data transmission via the second communication channel is higher than the quality of data transmission via the first communication channel by a predetermined amount and to determine the first time period and the second time period such that the second time period is longer than the first time period if the quality of data transmission via the first communication channel is higher than the quality of data transmission via the second communication channel by a predetermined amount.

The first data transmission for example starts before the second data transmission and the determiner is for example configured to determine the first time period and the second time period such that the first time period precedes the second time period. The first time period and the second time period are for example contiguous. Alternatively, the first time period and the second time period may comprise separate time intervals.

It should be noted that the reception quality may be evaluated per burst and used to change a decision, meaning that if the reception quality has improved the determiner may change the decision which data transmission to receive. So, quality can be used for a first decision, but new indications can be used to change that.

The communication device is for example a mobile communication device.

The first data transmission and the second data transmission (or at least one of them) are for example transmissions of control data.

The communication device may for example be a subscriber terminal of a first mobile communication network and a subscriber terminal of a second mobile communication network and the first data transmission is for example a data transmission by a base station of the first mobile communication network and the second data transmission is for example a data transmission by a base station of the second mobile communication network.

For example, the first mobile communication network and the second mobile communication network are mobile communication networks using different radio access technologies. In other words, the described approach may be applied in a cross system scenario. For example, the mobile communication networks may be cellular communication network according to two different standards, for example among GSM, UMTS, LTE or TD-SCDMA. The first mobile communication network and the second communication network may also use the same radio access technology.

The first mobile communication network and the second mobile communication network are for example mobile communication networks according to different communication standards. The first mobile communication network and the second communication network may also be mobile communication networks according to the same communication standard.

The first data transmission is for example a transmission of data including paging data and/or system information of the first mobile communication network.

The controller is for example configured to control the receiver to receive data transmitted in the first data transmission during the first time period and to receive data transmitted in the second data transmission during the second time period when the communication device is in idle mode. However, the the controller may also be configured to control the receiver to receive data transmitted in the first data transmission during the first time period and to receive data transmitted in the second data transmission during the second time period when the communication device is in other modes, e.g. in connected mode.

The determiner is for example configured to determine the information about the quality of data transmission via the first communication channel and the information about the quality of data transmission via the second communication channel.

The receiver is for example configured to provide the information about the quality of data transmission via the first communication channel and the information about the quality of data transmission via the second communication channel.

The receiver is for example configured to provide the information about the quality of data transmission via the first communication channel based on a data transmission via the first communication channel preceding the first data transmission and to provide the information about the quality of data transmission via the second communication channel based on a data transmission preceding the second data transmission. In other words, the receiver for example provides the information based on a quality evaluation of one or more previous transmissions. For example, the receivers uses a quality measure it gets from a reception of data.

The information about the quality of data transmission via the first communication channel may for example be information about the strength of signals received via the first communication channel.

The information about the quality of data transmission via the second communication channel is for example information about the strength of signals received via the second communication channel.

For example, the information about the quality of data transmission via the first communication channel is information about the signal to noise ratio of signals received via the first communication channel.

For example, the information about the quality of data transmission via the second communication channel is information about the signal to noise ratio of signals received via the second communication channel.

The determiner is for example configured to determine the first time period and the second time period before the first data transmission and the second data transmission are started. For example, the determiner regularly determines the allocation of reception times for future overlapping data transmissions, e.g. each time it is provided with information about the quality of data transmissions via the communication channels (i.e. the reception qualities of the communication channels). The determiner may also be configured to adapt the allocation of reception times based on received information, i.e. to determine the first time period and the second time period based on an earlier first time period used for an earlier data reception and an earlier second time period used for an earlier data reception and the results of these data receptions. For example, the determiner determines the first time period such that it is longer than a time period used for an earlier reception of data via the first communication channel in case that there was an error in decoding the data received earlier.

The first time period is for example a number of radio frames and the second time period is for example a number of radio frames.

The determiner is for example configured to determine the first time period and the second time period further based on at least one of priority information about the first data transmission and the second data transmission, timing information about the first data transmission and the second data transmission and redundancy information about the first data transmission and the second data transmission. The determiner may for example be configured to weigh these parameters (reception qualities, priorities etc.) for the determination of the first time period and the second time period. For example, the first time period may be longer than the second time period even if the reception quality of the first communication channel is higher than the reception quality of the second communication channel in case that the first data transmission has a much higher priority than the second data transmission.

The determiner is for example configured to determine the first time period and the second time period based on a maximization of the likelihood that at least one of the data transmitted in the first data transmission and the data transmitted in the second data transmission can be completely received taking into account redundancy of the first data transmission and of the second data transmission.

Figure 5:
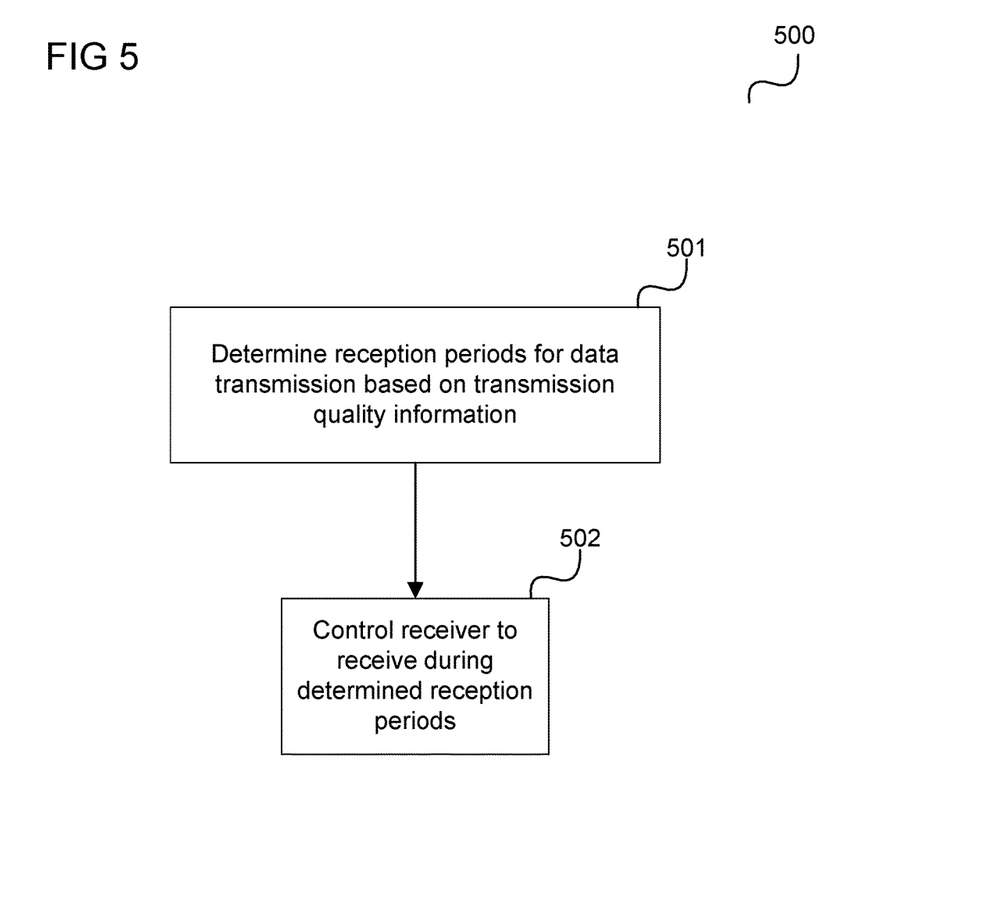
FIG. 5 shows a flow diagram.

The communication device 400 for example carries out a method as illustrated in FIG. 5.

FIG. 5 shows a flow diagram 500.

The flow diagram 500 illustrates a method for controlling a receiver.

In 501, a communication device determines, for a first data transmission via a first communication channel and a second data transmission via a second data communication channel, wherein the first data transmission and the second data transmission overlap in time, a first time period during which the receiver is to receive data transmitted in the first data transmission and a second time period during which the receiver is to receive data transmitted in the second data transmission based on information about the quality of data transmission via the first communication channel and based on information about the quality of data transmission via the second communication channel.

In 502, a controller controls a receiver to receive data transmitted in the first data transmission during the first time period and to receive data transmitted in the second data transmission during the second time period.

It should be noted that examples and aspects described in context of the communication device 400 are analogously valid for the method as illustrated in FIG. 5 and vice versa.

The components of the communication device (e.g. the receiver, the determiner and the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java, or a programming language such as C or Assembler. Any other kind of implementation of the respective functions which will be described in more detail below may also be understood as a "circuit".

An example of the operation of the communication device 400 in context of the scenario illustrated in FIG. 3 is given in the following.

In this scenario, the first data transmission including the paging data transmissions 311 overlaps with the second data transmission including the paging data transmissions 312 in three frames (in other words, the timing of three bursts overlaps).

As an example, it is assumed that the quality of a first communication channel used for the first data transmission (i.e. the reception quality for the first data transmission) is high and that the quality of a second communication channel used for the second data transmission (i.e. the reception quality for the second data transmission) is low.

The data of both data transmissions may be received with less than the complete four bursts by utilizing redundancy, e.g. due to coding and spreading of GSM channels.

Since in this case, as the first communication channel has for example proven good quality (e.g. in previous reception activities) and the second communication channel has shown lower quality the determiner 402 for example decides, when deciding up front how many bursts of which data transmission should be received, to receive data from the first data transmission in the first frame 303 and the second frame 304 (i.e. to receive only two bursts of the first data transmission) and to receive data from the second data transmission in the sixth frame 308, the seventh frame 309 and the eighth frame 310 (i.e. to receive three bursts of the third data transmission).

Alternatively, for example, even in view of the higher quality of the first communication channel, the determiner may determine to receive three bursts of the first data transmission and only two bursts of the second data transmission e.g. because the data of the first data transmission needs to be received with high priority and thus the likelihood of receiving the data should be high. For example, a high priority is given to a data transmission via a communication channel if a previous reception of data via the communication channel was corrupted by bad quality.

In another case, for example, the determiner may also determine to receive all four bursts of one of the data transmissions (which may lead to not being able to receive any data of the other data transmission) due to priority and knowledge of bad channel conditions for the data transmission.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communications device comprising:
    a first subscriber identity module configured to enable operation in a first radio communication network;
    a second subscriber identity module configured to enable operation in a second radio communication network;
    a receiver configured to receive data transmissions comprising a first data transmission via a first data communication channel of the first radio communication network and a second data transmission via a second data communication channel of the second radio communication network,
    wherein the first data transmission and the second data transmission are at least partially overlapping within an overlap time period;
    a determiner configured to determine a first partial time period of the overlap time period corresponding to a portion of the first data transmission, and further configured to determine a second partial time period of the overlap time period corresponding to a portion of the second data transmission,
    wherein the determiner is configured to determine which of the first partial time period and the second partial time period is longer based on which of the first data communication channel and the second data communication channel has a higher channel quality; and
    a controller configured to control the receiver during the overlap time period to receive data from the portion of the first data transmission during the first partial time period and to receive data from the portion of the second data transmission during the second partial time period.

2. The mobile communications device of claim 1, wherein a sum of the first partial time period and the second partial time period is equal to the overlap time period.

3. The mobile communications device of claim 1, wherein the first partial time period is longer than the second partial time period when the channel quality of the second communication channel is higher than the channel quality of the first communication channel by a predetermined amount.

4. The mobile communications device of claim 1, wherein the second partial time period is longer than the first partial time period when the channel quality of the first communication channel is higher than the channel quality of the second communication channel by a predetermined amount.

5. The mobile communications device of claim 1, wherein the first data transmission starts before the second data transmission and wherein the determiner is configured to determine the first partial time period and the second partial time period such that the first partial time period precedes the second partial time period.

6. The mobile communications device of claim 1, wherein the first partial time period and the second partial time period are contiguous.

7. The mobile communications device of claim 1, wherein at least one of the first data transmission and the second data transmission is a transmission of control data.

8. The mobile communications device of claim 1, wherein the first mobile communication network and the second mobile communication network are mobile communication networks using different or same radio access technologies.

9. The mobile communications device of claim 1, wherein the first mobile communication network and the second mobile communication network are mobile communication networks according to different or same communication standards.

10. The mobile communications device of claim 1, wherein the first data transmission is a transmission of data comprising at least one of paging data and system information of the first mobile communication network and the second data transmission is a transmission of data comprising at least one of paging data and system information of the second mobile communication network.

11. The mobile communications device of claim 1, wherein the controller is configured to control the receiver to receive data transmitted in the first data transmission during the first partial time period and to receive data transmitted in the second data transmission during the second partial time period when the communication device is in idle mode.

12. The mobile communications device of claim 1, wherein the determiner is configured to determine the channel quality of the first communication channel and the channel quality of the second communication channel.

13. The mobile communications device of claim 1, wherein the receiver is configured to provide to the determiner the channel quality of the first communication channel based on a data transmission via the first communication channel preceding the first data transmission and to provide the channel quality of the second communication channel based on a data transmission via the second communication channel preceding the second data transmission.

14. The mobile communications device of claim 1, wherein the information about the quality of data transmission via the first communication channel is at least one of information about a signal strength of the first communication channel and information about the signal to noise ratio of the first communication channel.

15. The mobile communications device of claim 1, wherein the information about the quality of data transmission via the second communication channel is at least one of information about the signal strength of the second communication channel and information about the signal to noise ratio of the second communication channel.

16. The mobile communications device of claim 1, wherein the determiner is configured to determine the first time period and the second time period before the first data transmission and the second data transmission are received at the receiver.

17. The mobile communications device of claim 1, wherein the first partial time period is a multiple number of radio frames and the second partial time period is a multiple number of radio frames.

18. The mobile communications device of claim 1, wherein the determiner is configured to determine the first partial time period and the second partial time period further based on at least one of priority information about the first data transmission and the second data transmission, timing information about the first data transmission and the second data transmission, and redundancy information about the first data transmission and the second data transmission.

19. A method for controlling a receiver of mobile communications device comprising a first subscriber identity module configured to enable operation in a first radio communication network and a second subscriber identity module configured to enable operation in a second radio communication network, the method comprising:
determining, for a first data transmission via a first communication channel of the first radio communication network and a second data transmission via a second data communication channel of the second radio communication network,
wherein the first data transmission and the second data transmission are at least partially overlapping within an overlap time period;
a first partial time period of the overlap time period corresponding to a portion of the first data transmission and a second partial time period of the overlap time period corresponding to a portion of the second data transmission, wherein the determination includes which of the first partial time period and the second partial time period is longer based on which of the first data communication channel and the second data communication channel has a higher channel quality; and
controlling the receiver during the overlap time period to receive data from the portion of the first data transmission during the first partial time period and to receive data transmitted from the portion of the second data transmission during the second partial time period.

20. The method of claim 19, wherein a sum of the first partial time period and the second partial time period is equal to the overlap time period.

* * * * *